B. H. JENKS.
Apparatus for Hydrating Gases.
No. 165,837. Patented July 20, 1875.
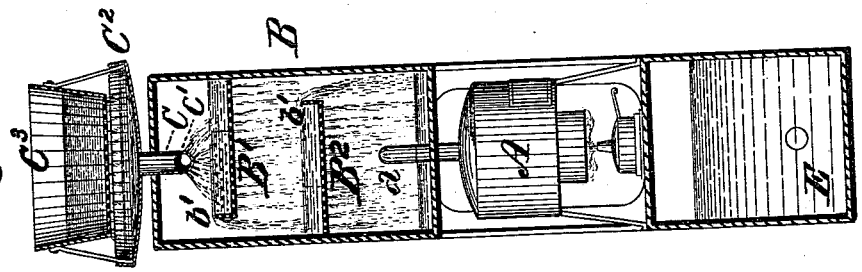
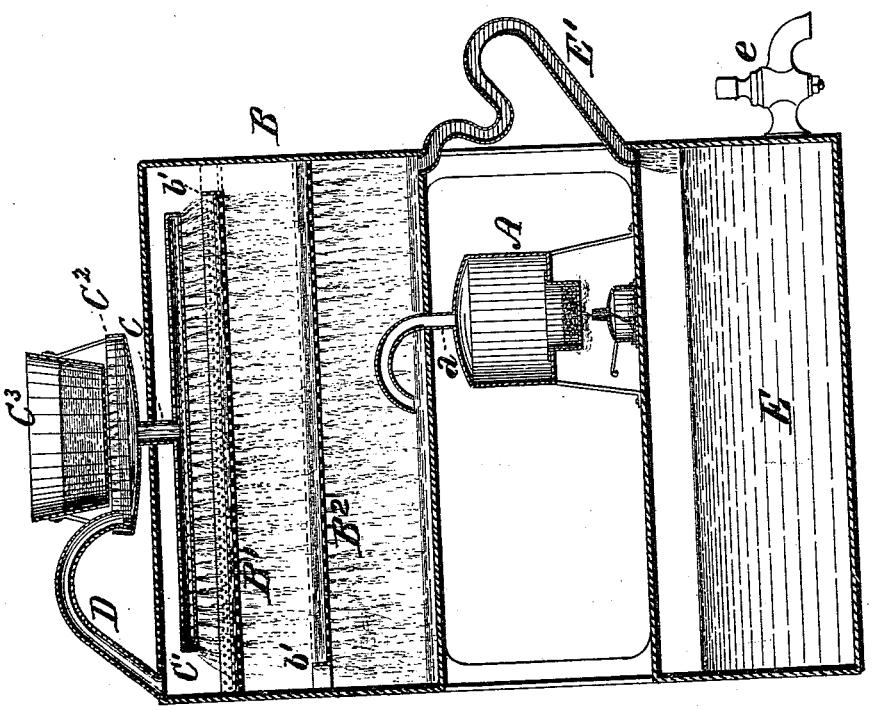
Witnesses:
John Overding
F. E. Harding
Inventor:
Barton H. Jenks
by J. Snowden Bell
atty.

UNITED STATES PATENT OFFICE.

BARTON H. JENKS, OF PHILADELPHIA, PENNSYLVANIA.

IMPROVEMENT IN APPARATUS FOR HYDRATING GASES.

Specification forming part of Letters Patent No. 165,837, dated July 20, 1875; application filed June 19, 1875.

*To all whom it may concern:*

Be it known that I, BARTON H. JENKS, of the city and county of Philadelphia, in the State of Pennsylvania, have invented certain new and useful Improvements in Apparatus for Hydrating Gases, of which the following is a specification:

My invention is primarily intended to provide suitable means for the manufacture of chlorine water as an article of commerce; but my improvements are equally applicable to the preparation in quantity of solutions of other gases.

Chlorine gas, by reason of the bleaching powers and disinfectant qualities which it possesses, is of great practical value and importance in the arts, and, as contained in the well-known bleaching-powder, (chloride of lime,) is used in enormous quantities in bleach-works, paper-mills, &c. The value of this compound, (chloride of lime,) is due to its chlorine, and the lime, which serves merely as a vehicle for its transportation, becomes, in the majority of cases, a waste and useless residuum. A solution of chlorine in water is, for obvious reasons, of much greater value to the bleacher or paper-maker; but, while such solution can be readily prepared in the laboratory, as water at 60° Fahrenheit absorbs about twice its volume of the gas, its manufacture upon a sufficiently-extended scale to make it a standard article of commerce has not heretofore, to the best of my knowledge, been practiced.

My invention is intended to provide an apparatus in which such manufacture can be conducted extensively and economically; and my improvements consist in combining a gas-generator, an absorber, separating-plates of peculiar construction, and conducting-pipes, all as hereinafter more fully set forth.

In the accompanying drawings, Figure 1 is vertical longitudinal section of an apparatus for hydrating gases, embodying my improvements; and Fig. 2, a vertical transverse section of the same.

To carry out the object of my invention, I provide a suitable gas-generator, A, of lead or other material proper for the purpose, which may be heated by a furnace or lamp, or by steam, as preferred. The construction of the generator and the preparation of the materials used for the evolution of the gas need not be here specifically described, as they, *per se*, form no part of my invention.

The evolved gas is conducted by a pipe, $a$, from the generator A to the lower portion of the absorber B, which is a large chamber, preferably of rectangular form, located above the generator. Separating-plates $B^1$ $B^2$, two or more, varying in number according to the capacity of the apparatus, are placed horizontally one above the other in the absorber B. The separating-plates are perforated over their entire surfaces with a number of fine holes, and may be provided with similarly perforated overflow-plates $b'$ at their sides and ends. The separating-plates, it will be observed, do not extend entirely across the absorber, each plate being united thereto only at one side, leaving a space between it and the wall of the absorber on the other, and the plates are arranged, as shown, so that the spaces are located alternately on opposite sides of the absorber. Similar spaces may be provided alternately at the ends of the plates. I have found plates of stout glass, perforated by the sand-blast process, to be well suited for use as separating-plates, and recommend them for that purpose, but other material may be used, if preferred. A water-supply pipe, C, is led into the top of the absorber, and terminates in a horizontal pipe, $C^1$, which is placed above the upper separating-plate, extending nearly the whole length thereof, and being perforated with a number of fine holes from end to end. An exit-pipe, D, leads from the top of the absorber, and is curved downward, having its lower end within a water-pan, $C^2$, from which pan the water-supply pipe C passes into the absorber. A tank, E, having a suitable cock or valve, $e$, serves for the reception of the water when impregnated with gas, and is connected with the bottom of the absorber by a pipe, E', bent so as to form a water-seal.

In the operation of the apparatus, cold water is supplied to the pan $C^2$, preferably through a filter, $C^3$, the level of the water in the pan being kept at such a height that the opening of the exit-pipe D shall be just below its surface. Suitable materials for generating gas are placed in the generator A, and a sufficient degree of heat is applied thereto. The water from the pan $C^2$ passes to the horizontal pipe $C^1$, and, escaping in numerous fine streams through the openings in the pipe, diffuses itself over the surface of the upper separating-plate $B^1$, trickling through the orifices thereof, and passing to the next plate, and so on through the absorber, being finally led from the bottom thereof to the storage-tank E by the pipe $E^1$. By means of the alternate arrangement of the spaces between the walls of the absorber and the separating-plates, portions of the water are caused to pass over the entire surface of the plates. The gas, in its upward passage through the absorber, is, as far as practicable, absorbed by the numerous fine streams of water passing downward therein, and its escape is prevented by the water-seal of the exit-pipe D, which, at the same time, prevents any danger of accident from excess of pressure. Moreover, any gas tending to escape from the pipe, being met by the fresh cold water of the pan, is, unless there should be an excess of pressure, immediately absorbed thereby. The impregnated water is drawn off, as required, by the cock e.

I am aware that the condensation or absorption of gases by the percolation of currents of water through a condenser has been heretofore proposed, such a system being exhibited in the English patent of W. Petrie, No. 590, of 1852, and in sundry Letters Patent of the United States and Great Britain subsequent thereto, and do not, therefore, broadly claim such a process. Neither do I broadly claim the use of distributing-plates for disseminating currents of water through a chamber, such device being well known in beer-coolers, feed-water heaters, &c.

I claim as my invention—

In an apparatus for hydrating gases, the combination of a gas-generator, an absorber provided with a series of perforated separating-plates, having overflow-spaces on alternate sides or ends of the absorber, or both, a water-supply pipe leading into the top of the absorber, an exit-tube for the gas, having its exterior opening within the water-supply pan of the absorber, and a water-sealed pipe connecting the bottom of the absorber with a storage-tank, substantially as set forth.

BARTON H. JENKS.

Witnesses:
J. SNOWDEN BELL,
O. M. BABCOCK.